(12) United States Patent
Hull (10) Patent No.: US 6,789,508 B2
(45) Date of Patent: Sep. 14, 2004

(54) SMALL ANIMAL AND RODENT EXERCISE DEVICE

(76) Inventor: Martin Philip Hull, 125 Johnson Rd., Port Angeles, WA (US) 98363

( * ) Notice: Subject to any disclaimer, the term of this patent is extended or adjusted under 35 U.S.C. 154(b) by 0 days.

(21) Appl. No.: 10/365,063

(22) Filed: Feb. 12, 2003

(65) Prior Publication Data

US 2003/0159661 A1 Aug. 28, 2003

Related U.S. Application Data

(63) Continuation of application No. 09/962,841, filed on Sep. 21, 2001, now Pat. No. 6,578,526.

(51) Int. Cl.$^7$ .............................................. A01K 15/02
(52) U.S. Cl. ...................................... 119/702; 119/700
(58) Field of Search ................................ 119/702, 700, 119/701, 703, 704, 707, 422, 752; D30/160; 482/147; 446/46, 266

(56) References Cited

U.S. PATENT DOCUMENTS

| | | | | |
|---|---|---|---|---|
| 9,090 A | * | 7/1852 | Tustin | |
| 511,272 A | * | 12/1893 | Hughes | 119/452 |
| 937,755 A | * | 10/1909 | Beatty | 108/139 |
| 1,521,946 A | * | 1/1925 | Hargreaves | 482/147 |
| 1,585,748 A | * | 5/1926 | Wendelken | 482/143 |
| 2,351,293 A | * | 6/1944 | Saunders | 482/147 |
| 2,467,338 A | * | 4/1949 | Sellards | 472/18 |
| 3,057,328 A | * | 10/1962 | Swartz | 119/700 |
| 3,384,369 A | * | 5/1968 | Rummell | 482/147 |
| 3,673,731 A | * | 7/1972 | Farhi et al. | 446/46 |
| 3,785,641 A | * | 1/1974 | Muffly | 472/40 |
| 3,788,277 A | * | 1/1974 | Willinger et al. | 119/700 |
| 3,933,126 A | * | 1/1976 | Gordon | 119/700 |
| 3,994,262 A | * | 11/1976 | Suchowski et al. | 119/700 |
| 4,088,094 A | * | 5/1978 | Howard | 119/700 |
| 4,153,252 A | * | 5/1979 | Sullivan | 473/588 |
| 4,220,329 A | * | 9/1980 | Agyagos | 482/147 |
| 4,291,873 A | * | 9/1981 | Lee et al. | 482/147 |
| 4,498,421 A | * | 2/1985 | Lovitt | 119/479 |
| 4,505,476 A | * | 3/1985 | Rubin | 482/147 |
| 4,793,266 A | * | 12/1988 | Napolitano et al. | 108/141 |
| 4,953,858 A | * | 9/1990 | Zelli | 482/147 |
| 5,125,361 A | * | 6/1992 | Rowlands | 119/700 |
| 5,344,376 A | * | 9/1994 | Bostic et al. | 482/118 |
| 5,649,503 A | * | 7/1997 | Woolfolk | 119/700 |
| 5,722,348 A | * | 3/1998 | Phillips et al. | 119/452 |
| 5,934,966 A | * | 8/1999 | Ward | 446/46 |
| 6,428,451 B1 | * | 8/2002 | Hall | 482/146 |

\* cited by examiner

Primary Examiner—Yvonne R. Abbott
(74) Attorney, Agent, or Firm—Douglas A. Chaikin; Peninsula IP Group (57) ABSTRACT

Disclosed is a small animal exercise device, suitable for allowing a small rodent or other small and trainable animal to be domesticated, and confined in a relatively small space while enjoying the benefits of exercise that accrue to mammals of all kinds. The exercise device includes a dish, a stand and a connecting assembly. The dish provides an effectively large and safe exercise surface, while physically fitting into the confined environment or small enclosure for small animals such as rodents and the like. The dish has an outer periphery and a raceway having a solid surface adjacent the periphery. The dish is rotatably connected to a stand, which elevates the dish above the horizontal surface upon which the stand rests, to allow the dish to rotate freely during rodent or other small animal exercise. The connecting assembly, includes among other things, a bearing assembly which fixedly, but rotatably connects the dish to the stand, more particularly, the distal end of the stand defines a bearing shaft. The bearing assembly allows rotation of the dish while being attached to the shaft and includes a limiting member for properly positioning the dish on the shaft which allows free rotation of the dish.

19 Claims, 6 Drawing Sheets

SMALL ANIMAL AND RODENT EXERCISE DEVICE

This application is a continuation of 09/962,841 filed Sep. 21, 2001, now U.S. Pat. No. 6,578,526.

BACKGROUND OF THE INVENTION

1. Field of the Invention

This invention relates to exercise device for small animals, more particularly this invention relates to a highly effective and space efficient device for allowing small confined animals to obtain the exercise they need for their optimum health, while not requiring the confined environment of such small animals beyond the physical dimensions of those which are traditionally and typically well accepted.

2. Previous Art

Past rodent or small animal exercise devices have proven at least somewhat successful. The animal can get some exercise and increase its health and life span. Consequently, the animal's owner benefits from a healthy animal with greater life span and lower maintenance costs.

The exercise devices are used extensively by healthy animals. For example, the animals have been observed to spend two or more hours of actual running time on the wheel per day providing that the exercising does not callus or otherwise abraid their feet or damage them in other ways. On the other hand, when exercise damages or hurts the animal in some way, there is considerably less exercise by the animal. Since the exercise is strictly voluntary, an exercise device must be comfortable for the animal to use to obtain the desired benefits.

It will also be appreciated by those familiar with rodents that these animals are nocturnal and typically exercise at night when their owners aren't present. That means if the animals damages itself, it must wait sometimes many hours before any assistance will be available. In many cases this can result in permanent injury and in some cases, it can be fatal to the animal.

Figure 1:
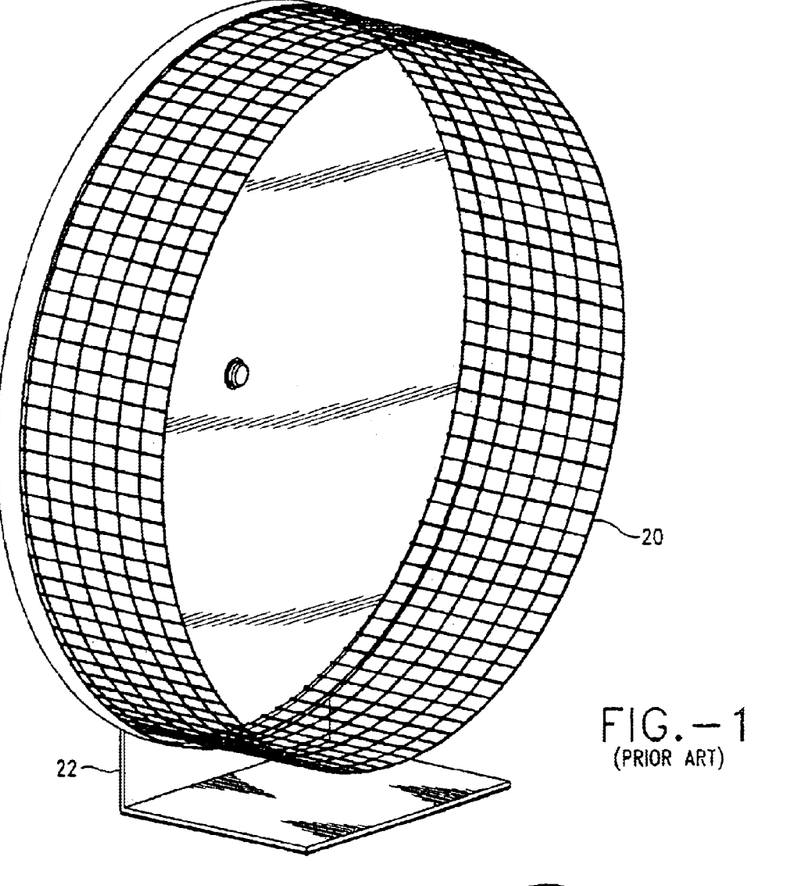
FIGS. 1 and 2 are exemplary embodiments of prior rodent exercise devices.
Figure 2:
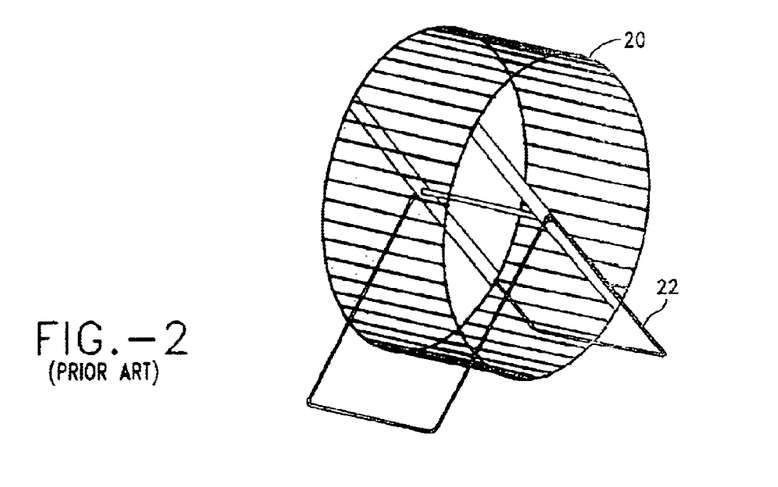

Such past devices have included what is typically known as a "hamster wheel" depicted in prior art FIGS. 1 and 2 and set forth as numeral 20. The hamster wheel 20 rotates while connected to a frame 22. The frame and wheel are situated in the animal's environment, typically a cage. Thus, the physical dimensions of the exercise device must be small enough to fit within the cage while large enough to accommodate the exercise for which they were intended.

The wheel 20 has what is known as an open structure wherein the wheel is in the form of a screen as shown clearly in FIGS. 1 and 2. Typically, the animal's appendage, e.g. a foot, can get caught in the screen. If the wheel 20 is spinning rapidly during exercise catastrophic injury can result. Such injury can include a broken foot or leg damaged so severely that amputation (either Veterinarian assisted or self imposed) would be required to save the animal's life. Amputation can costs hundreds or even thousands of dollars. Needless to say not every pet owner has such readily available cash. In such cases, despite the love and caring that owners may well feel for their animals, the animal's death is a likely result.

Exercise also benefits the animals because it represents a challenge and a learning experience. Early on, an animal may be frightened by the device and gradually when it sees other similar animals using the device, it may start to learn how to use it. After using it for some time, the animal may well become quite skilled at using the device and have a positive outlook toward itself and other inhabitants of its environment and toward its owner(s).

Another constraint of the exercise device is that it be small enough to fit in the door opening of the animal's confined environment or cage. Typically, the exercise device must fit through the animal's cage door. Very few cages have a removable sides or a top or a bottom. Most such cages have only a hinged door and the exercise device must be sufficiently small to fit through such a door. The larger wheels tend to function better and are preferable to the animals because they allow better exercise.

Cages tend to be from 12 inches in height by 16 inches in width and length to 18 inches in height by 24 inches in width and length. The physical dimensions of the wheel 20 must be such to allow it to fit within the cage. The wheel 20 tends to be 12 to 14 inches in diameter and typically provides a running surface having a width of approximately 4 to 5 inches. It is preferable to have such a wheel 20 to provide an adequate surface for the animal to exercise on without arching its back or interfering with its normal running or trotting movement. Clearly, using the past construction of the wheel 20, at least one dimension of the cage would need to exceed the diameter of the wheel in order to fit the wheel within the cage. This is true since typically none of the top, sides or bottom are removable. It is not impossible to force fit smaller cages with a larger wheel using the present configuration of the wheel 20.

As will be appreciated from FIGS. 1 and 2, the wheel 20, in effect, includes a ceiling which limits the size of an animal on the wheel, in addition to the other deficiencies previously discussed. Additionally, in order to perform exercise in the opposite direction, the animal typically disembarks from the wheel 20 and turns around What is needed is a small animal exercise device which will allow the animal to exercise in safety and comfort. Also, the device should fit easily into even small cages, if possible, without disassembly. The exercise device should provide an effective radius of exercise great enough to accommodate the animal's exercise needs.

SUMMARY AND OBJECTS OF THE INVENTION

It is an object of the present invention to provide a small animal exercise device, which enables a rodent or similar small animal to obtain exercise safely.

It is an additional object of the present invention to provide a small animal exercise device which allows a rodent or similar small animal to exercise without the risk of sustaining injury to its limbs during the exercise.

It is an additional object of the present invention to provide a small animal exercise device, which can be easily fit into even a small cage while providing the animal with a device large enough for its exercise needs.

It is an additional object to provide such a small animal exercise device, which is suitable for a variety of small animals including most small rodents.

It is an additional object to provide such a small animal exercise device, which provides the small animal with an exercise and a learning experience.

In accordance with the aforementioned objects and those that will be mentioned and will become apparent below, a small animal exercise device according to the present invention comprises:

a dish having a surface suitable for rodent exercise, the dish having an outer periphery and a raceway suitable for rodent exercise adjacent the outer periphery, the raceway suitable for animal exercise and defining a solid surface;

a stand for connection with the dish, the stand having a proximal and a distal end, the proximal end serving as a base and the distal end for connection with the dish, such that the dish is rotates freely under rodent exercise; and a connecting assembly for rotatably connecting the dish to the stand, whereby, rodent exercise occurs on the solid surface of the raceway.

In an exemplary embodiment of an exercise device according to the present invention, the base rests upon a horizontal surface and the dish is elevated above the surface to allow the dish to rotate freely under small animal exercise. Additionally, the dish makes an angle with the horizontal surface of approximately 60° ($\beta$).

In another exemplary embodiment, the angle the dish makes with the horizontal surface upon which the stand rests is adjustable.

In another exemplary embodiment of a rodent exercise device according to the present invention, the dish is shaped such that it forms an angular shape ($\alpha$) between 80° and 150° and in a preferred embodiment the angular shape is approximately 120°.

Another exemplary embodiment of a rodent exercise device according to the present invention includes an inner section defining a frusto-conical shape. The stand is connected to the dish at the inner section.

Also in accordance with the above objects and with those that will be mentioned and will become apparent below, a rodent exercise device in accordance with the present invention comprises:

a dish having a surface suitable for small animal exercise, the dish having an outer periphery and a raceway suitable for small animal exercise adjacent the outer periphery, the raceway suitable for small animal exercise and defining a solid surface and the dish inner zone suitable for animal exercise defining a frusto-conical shape, the inner zone having an opening;

a stand for connection with the dish, the stand having a proximal and a distal end, the proximal end serving as a base and the distal end for connection with the dish, such that the dish is rotates freely under small animal exercise; and a connecting assembly for rotatably connecting the dish to the stand at the inner zone and each of the connecting assembly and the inner zone having an opening for accommodating the stand, whereby, small animal exercise occurs on the solid surface of the raceway.

In other exemplary embodiments of a rodent exercise device according to the present invention, the dish is perforated.

An advantage of the present invention is that an exercise device is provided for small animals which enables them to exercise to obtain health benefits without significant risk of serious injury.

Another advantage of the present invention is to provide an exercise device for small animals which fits within a small confined area and provides a more than adequate surface for exercise.

Another advantage of the present invention is to provide an exercise device which is usable for a broad range of small animals since the exercise device in accordance with this invention does not have a ceiling limitation.

Another advantage of the present invention is to provide an exercise device which allows an animal to turn around on the exercise device without dismounting.

BRIEF DESCRIPTION OF THE DRAWING

For a further understanding of the objects and advantages of the present invention, reference should be given to the following detailed description, taken in conjunction with the accompanying drawings, in which like parts are given like reference numerals and wherein.

DETAILED DESCRIPTION OF THE INVENTION

For the animal to perform its exercise in its enclosure, it must do so in place, as with using the device of the instant invention, the animal is untethered and moves in place along an endless incline plane. Prior art wheels, such as wheel 20 illustrated in FIGS. 1 and 2, also provided such a plane. The wheel 20 rotates around a center axis and is supported by a stand resting on the floor of the cage or animal enclosure or sometimes attached to the sides of the cage or animal enclosure.

The wheel 20 is attached to its center axis by spokes or a sidewall. The included surface is thus provided in front of the animal on an endless basis during exercise. Assuming, as is typical, that the wheel 20 is evenly balanced or at least generally circular, the lowest energy or start position for exercise is when the center of mass of the animal is directly below the center axis of the wheel 20. When the animal moves forward along the endless incline, gravitational force expressed as a moment of force causes the wheel to rotate in an opposite direction. The same is true for each successive step. Thus, the animal, as noted above, remains stationary while obtaining the desired exercise.

The invention will now be described with reference to the drawings and most particularly to FIG. 3, which illustrates a perspective view of an exemplary embodiment of a rodent exercise device according to the present invention generally denoted by the numeral 50. The rodent exercise device 50 includes a dish 52, a stand 54 and a connecting assembly 56.

The dish 52 provides a solid surface for the rodent to run or exercise upon. The dish 52 has an outer periphery 58 defining a raceway 60. As will be described more fully hereinafter the rodent runs on the raceway 60 and the effective exercise is much greater than the actual diameter of the dish.

Figure 4:
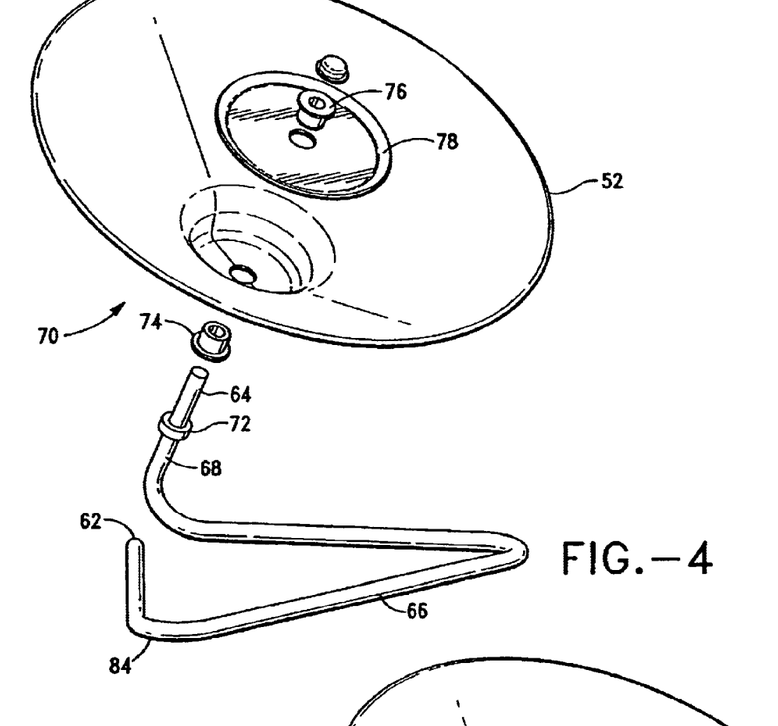
FIGS. 4 and 5 are exploded perspective views of an exemplary embodiment of the small animal exercise device in accordance with this invention.
Figure 5:
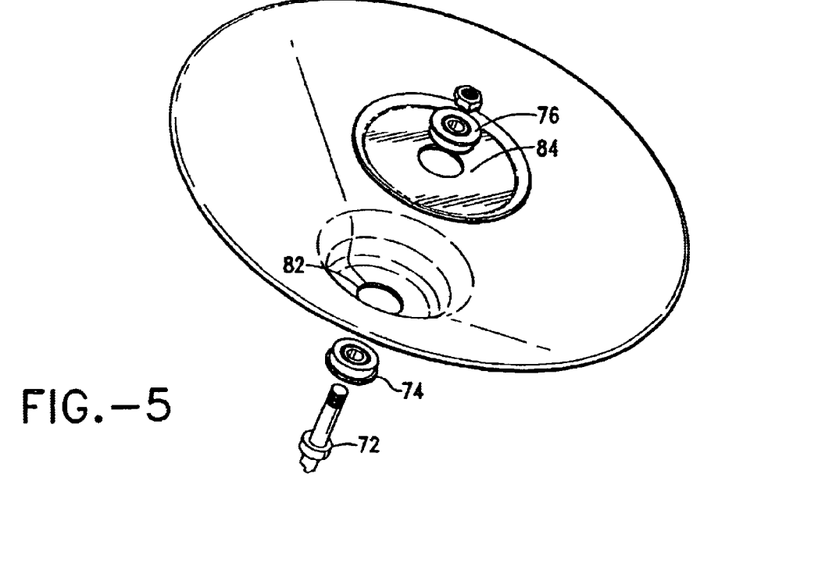

With respect to FIGS. 4 and 5, there is illustrated the stand 54 having a proximal end 62 and a distal end 64. The proximal end 62 serves as a base 66 and the distal end 64 defines a bearing shaft 68 for facilitating rotatable connection with the dish 52.

The connecting assembly 56 includes a bearing assembly, generally denoted by the numeral 70. The bearing assembly 70 includes a limiter 72, a first and a second bearing 74 and 76, respectively, a center disk 78 and a locking nut 80. The limiter 72 includes a locking screw (not shown) for correctly positioning the dish on the bearing shaft 68. The locking screw may be adjusted for re-positioning the limiter 72 and therefore the dish 52 on the bearing shaft 68.

The first bearing 74 defines a flanged bearing with its flanged end in abutting contact with the limiter 72 and being threaded on the bearing shaft 68 after the limiter 72 has been properly positioned to the desired location. The dish 52 has an center opening 82 through which the bearing shaft 68 is threaded. The center disk 78 also includes a center opening 84 aligned with the center opening 82 of the dish 52. The second bearing 76 also defines a flanged bearing and is threaded on the bearing shaft 68 in opposed relation to the first bearing 74. The bearing shaft 68 in a preferred embodiment has a threaded distal end. The locking nut 80 is threaded over the threaded distal end with the flanged portion of the second bearing 76 in abutting relation to the locking nut 80.

As will be appreciated, the exercise device in accordance with this invention rotates on and is supported by the two bearings 74 and 76. It has been observed that two bearings work better than one. Additionally, the wider the separation between the bearings 74 and 76, the more stable the device will be and the less wear producing torque will be exerted on the bearings.

Figure 3:
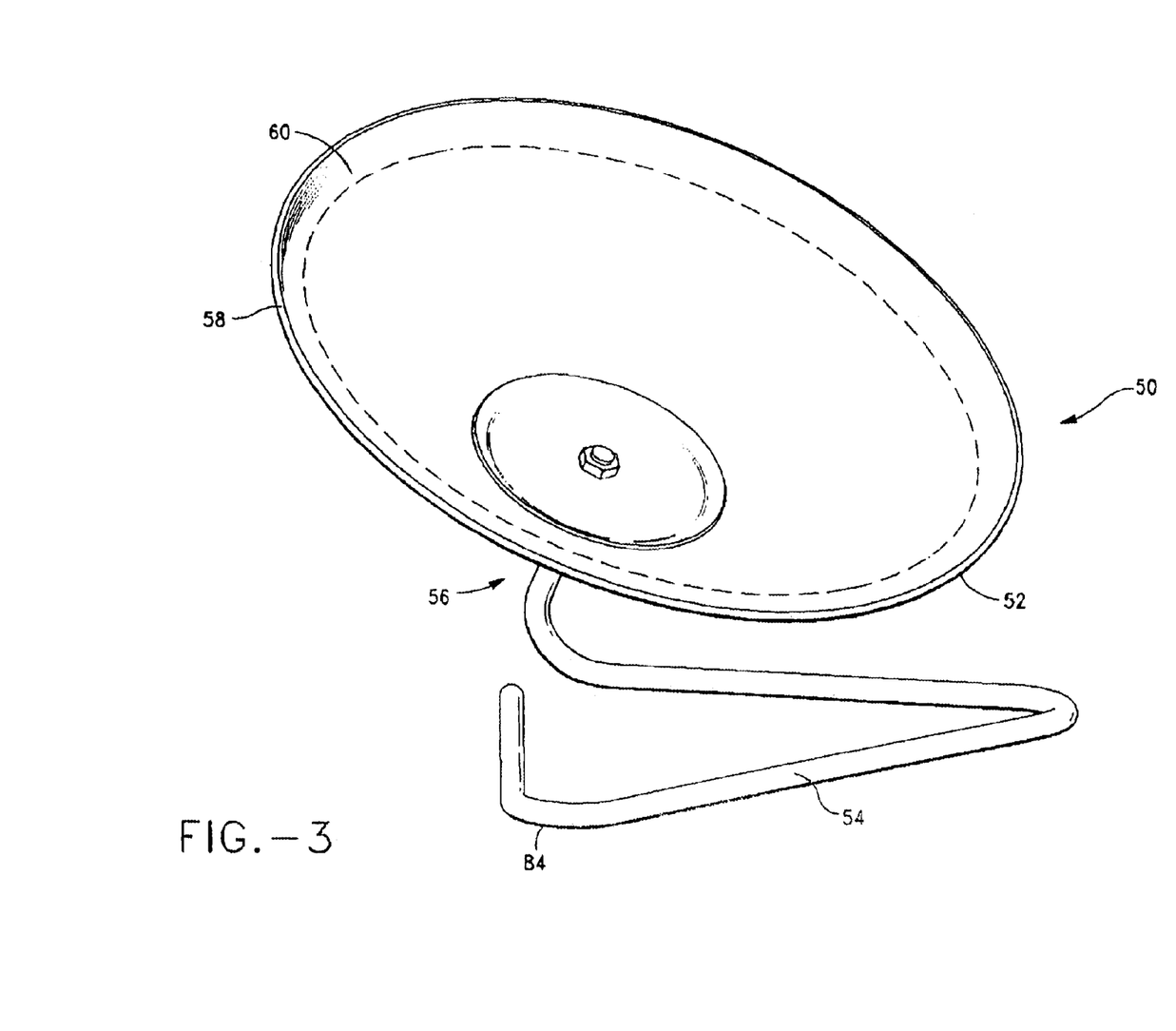
FIG. 3 is a perspective view of an exemplary embodiment of a small animal exercise device in accordance with this invention.

The stand proximal end 62 defines a base 84 upon which the device 50 rests as clearly illustrated in FIGS. 3–5. The base 84 rests upon a horizontal surface and elevates the dish 52 so that it can rotate freely during animal exercise. The base 84 is angled sized and shaped to provide elevation and stability during animal exercise.

Figure 9:
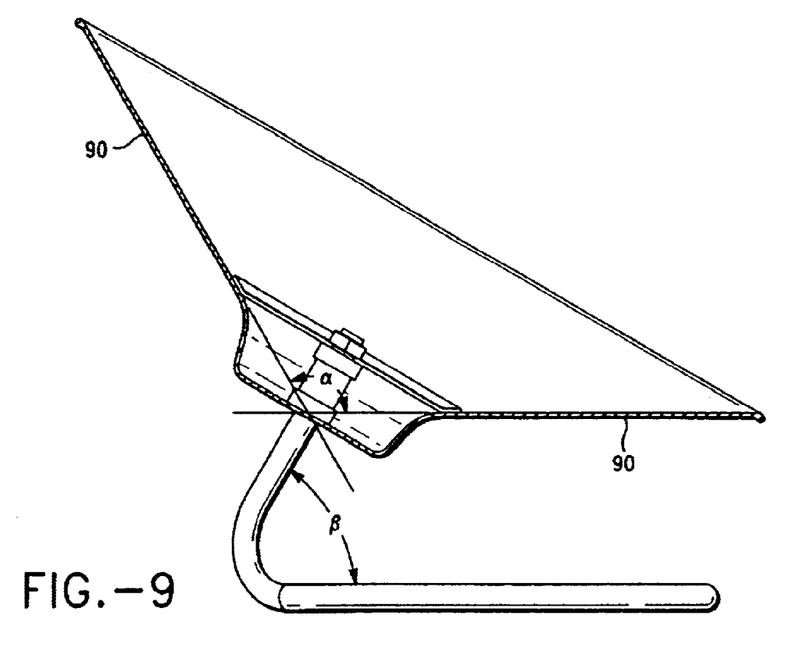
FIGS. 9 and 10 illustrate the dish being positioned at different relative angles to the horizontal.
Figure 10:
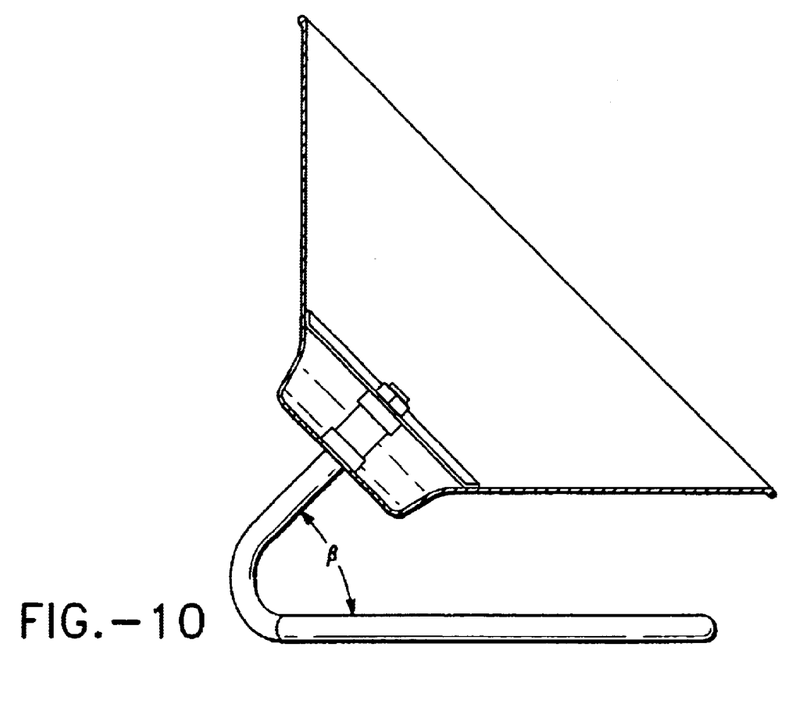

The dish 52 has a generally parabolic shape expanding outwardly and includes two basic portions, an outer zone 86 and an inner zone 88 as clearly shown in FIGS. 9 and 10 as well as the other FIGS. in the drawing. The shape is defined by a curvature of between 100° and 140°. In other words, taking the lines 90 formed by the cut-away portions of the dish in FIGS. 9 and 10 and extending them until they meet will cause an angle a of between 80° and 150°. However, it is also believed that the preferred angle a is approximately 120° for the reasons given herein.

The dish having an angle of curvature of 120° is preferred because it will accomplish the objects of the invention and tend to maximize the efficiency of space and animal exercise. Additionally, such an angle of curvature and those within the range from approximately 80° to 150° will accommodate an animal larger than will that of the prior art device 20 having comparable radius because there is no height restriction since there is no effective ceiling in the exercise device in accordance with the invention and because there are no side walls and the like to restrict the animal's movement. Additionally, the dish 52 provides a running path that allows the animal exercising to reverse direction without dismounting from the device.

To change directions in the prior art wheel 20, the exercising animal had to dismount, reverse direction and remount. In many cases using the prior art wheel 20, the exercise surface width is inadequate, for example, if the animal's owner is unable to get a larger wheel into the cage, the animal fur is likely to rub against the spokes or side-wall causing damage. The value of many of these animals is dependent on the color and quality of the fur.

The dish 52 provides a non-vertical sidewall with no spokes or obtrusive vertical sidewalls to cause damage to the animal or its fur. Since the axis of the dish is at 60° degrees from horizontal, the center portion of the disk slopes away from the exercise surface at 150°, providing ample room for the animal to exercise freely and to reverse direction without dismounting.

The 120° degree dish 52 provides a suitable inclined surface in front of the animal on which to perform work and ample space in every direction for the animal to be comfortable. As the dish or cone apex angle decreases from 120° to 80° or 90°, for example, the slope increases and the room around the animal decreases. An 80° or 90° dish 52 still allows an animal larger than a prior art device of like radius, however not as large as an animal as the 120° dish would accommodate.

As the angle increases past 120°, the slope of the surface in front of the animal effectively decreases and thus the ability to perform work in place also decreases.

Additionally, the 120° dish with a 14 inch diameter will fit through a cage door measuring 10"×10" or 9"×12" or larger because the angle allows for greater manipulation of the device into the animal enclosure.

The 120° dish is a more flexible configuration than, for example, a 14 inch dish with an angle of 90°. The 90° dish will fit through a 10×10 door opening. However, the same dish will have difficulty fitting through a 9×12 opening.

Devices with an angle of greater than 120° and up to 150° will function reasonably well although the inclined plane in front of the animal decreases as the angle increases. Devices with an angle greater than 120° will fit through the same sized door openings as the 120° dish. Since the device must be mounted so the exercise path is horizontal, the 140° to 150° dish will take up considerably more cage floor space than the 120° dish.

The 14 inch dish is adequate for animals up to approximately 2 ½ pounds. The exercise device in accordance with the invention may be scaled up or down, while still creating the same benefits over comparably sized prior art devices.

FIGS. 9 and 10 also illustrate the curvature of the distal end 64 with respect to horizontal. As shown in FIGS. 9 and 10, the angle β can vary. It has been found that angle β is preferably around 60°.

Figure 7:
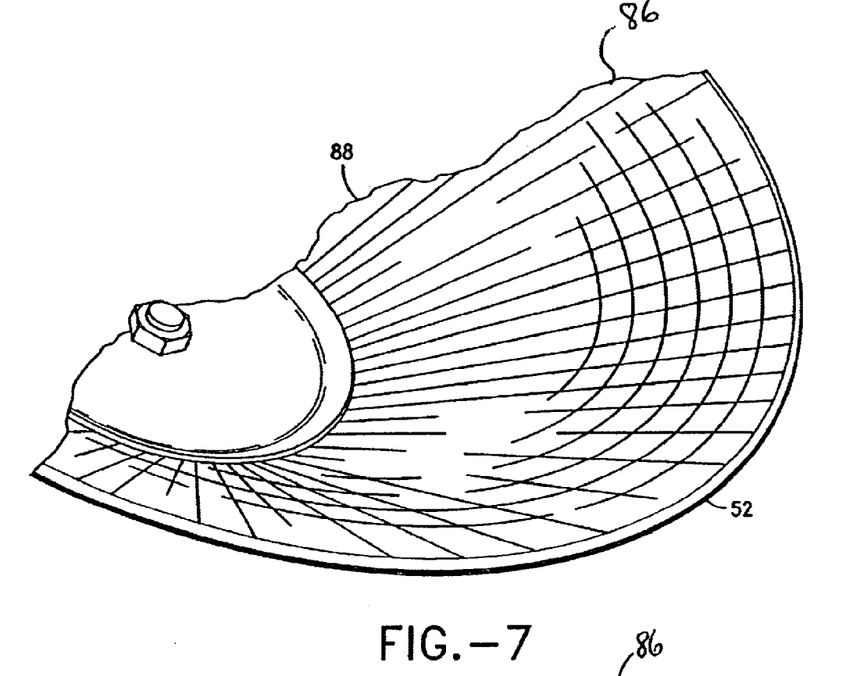
FIGS. 7 and 8 are partial perspective views of the small animal exercise device in accordance with this invention.
Figure 8:
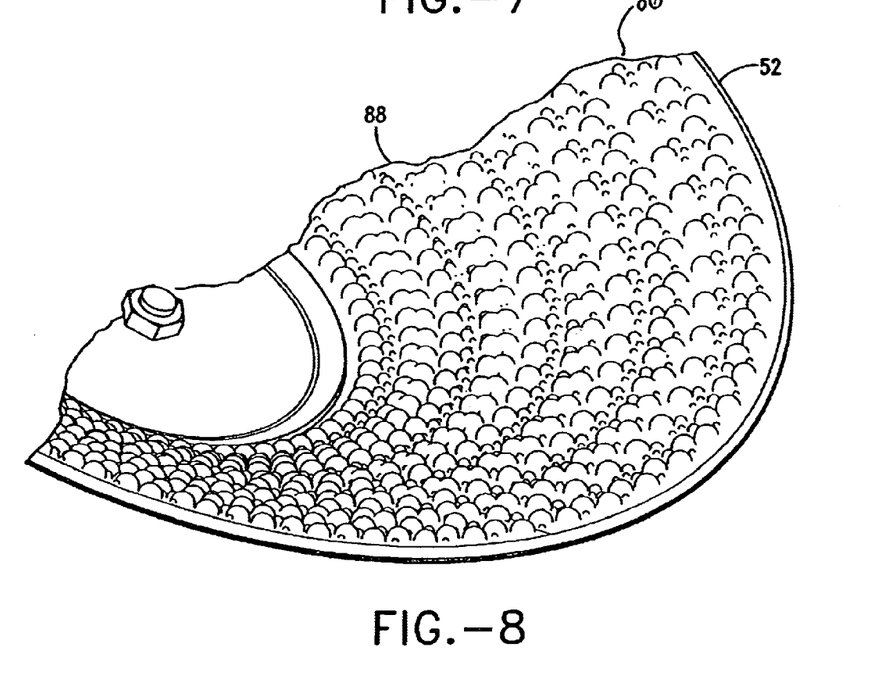

The inner zone 88 of the dish 52 defines a frusto-conical shape also clearly shown in the cut away figures of FIGS. 9 and 10. A perspective view of the inner zone 88 is shown with respect to FIGS. 7 and 8. A slight modification to the center portion of the 120° dish permits an increase in the distance between the bearings 74 and 76, over what would be available if the device were a 120° dish only. This modification does not unfavorably impact on fabrication cost, still yields an adequate width of exercise surface and allows the dish to fit into standard cages more often.

The dish 52 is made using a metal spinning process. It will be appreciated that a metal stamping or similar process may well be used within the spirit and scope of this invention to make the dish 52. A circular disk of metal is rotated at a high speed and formed to the desired pattern. Typically, the exemplary materials for the dish 52 are aluminum and galvanized steel. It will be appreciated by those familiar with such exercise devices that almost any material having malleable characteristics may be used. It will also be appreciated that materials such as wood or plastic should be avoided since rodents and similar small animals will find them appetizing and eat them.

Typically the opening 82 is a ⅞" hole punched in the center for receiving the second flanged bearing 76.

The center disk 78 is similarly made using a metal spinning process and likewise is made from similar materials. In an exemplary embodiment, the center disk 78 is permanently attached to the dish 52 by three or four rivets.

Effective Radius of Dish:

Upon observation, the rodent will run only on the outer surface of the dish 52, adjacent the periphery of the dish 52. This running space is defined as the raceway. It will be appreciated that the raceway defines a solid surface to facilitate safe exercise and a proper gripping surface for the rodent.

Figure 6:
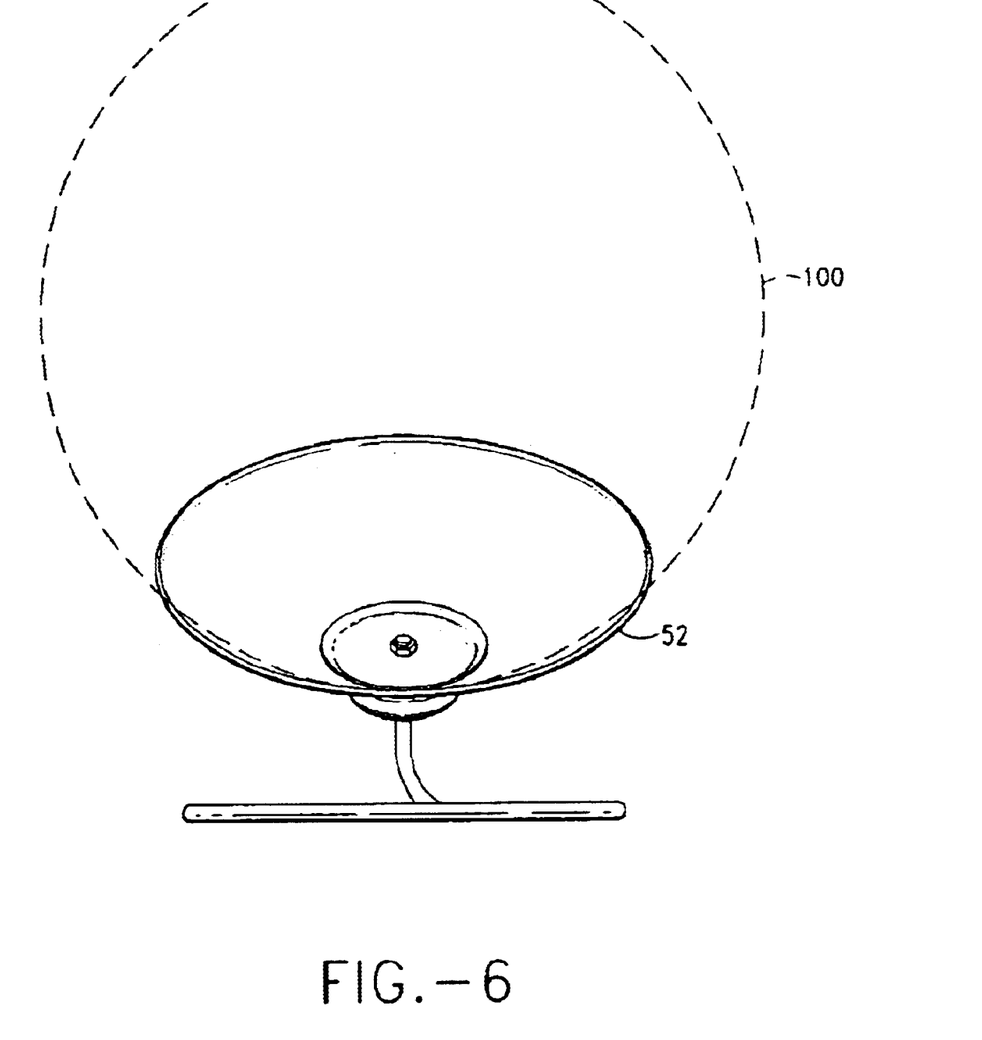
FIG. 6 perspective view of the small animal exercise device in accordance with this invention illustrating in the effective overall radius of the device.

With respect to FIG. 6, there is shown the effective distance of the running surface or raceway. In other words, the effective radius of the dish 52 for facilitating the exercise of the animal. For example, in an exemplary embodiment, the dish 52 has a radius of 7". However, because the rodent only runs in a vertical plane, a larger radius is really what controls the dimension.

To determine the actual effective radius of exercise an expandable hoop 100 shown in FIG. 6 is employed. First the hoop 100 is expanded until it has a diameter of 24 inches (radius equals 12 inches). The hoop is held in the vertical plane and placed so that it contacts the surface of the dish approximately 1½" in from the dish 52 edge, the periphery where the animal runs. This demonstrated the effective distance or diameter of the dish 52. An actual 7" diameter results in an effective 12" striding or exercising diameter for the animal.

In Use:

The rodent or small animals stride on the dish 52 is not what the animal would normally use in the wild. In the wild, the rodent would push off the terrain and its head and body would typically bounce up and down. As can be appreciated, the rodent dodges from side to side in the wild to avoid being a predator's meal. Since no such hazards exist in a confined environment, the idea is to give the rodent or other small animal a smooth running surface to afford the rodent the ability to safely get effective and health promoting exercise.

It is known by those familiar with rodents that typically, rodents exercise in bursts. When the rodent runs or jumps it activates most of their body muscle mass. This is the same type of exercise desired to be achieved by the device 50.

The rodent must learn to properly use the device 50. Since this is not within its normal exercise, there is a learning curve which upon testing was quite easily done by most rodents. The rodent jumps onto the dish 52 and may well jump off the first several times. Once the rodent finds a comfort level on the dish 52, it will attempt to rotate the dish 52. Again, it may take several attempts before the rodent learns how to spin the dish effectively and comfortably.

The rodent makes adjustments in its stride to compensate for running on the dish 52. Additionally, since the dish 52 can be adjusted the rodent must also make compensations for the various sized different arcs, depending upon the angle (β angle) that the dish 52 makes with the horizontal. In an exemplary embodiment, the β angle can be adjusted within the scope of this disclosure.

It should be noted that if the device is significantly smaller than the animal's stride, the animal will need to make significant adjustments to keep from either jumping or crashing into the dish 52. Typically, the animal will curtail its normal tendency to spring forward at the end of its stride.

If the device's effective radius is significantly greater than the animal's stride, the animal will have a tendency to bounce up in the middle of the stride and the animal would lose contact with the device and hence control. While this type of stride works well in the wild, it does not allow the animal to maintain control and sound footing on the dish 52. To maintain control and sound footing, the animal adjusts its stride. The animal decreases the pushing force in the mid-portion of the stride. The cadence of the animal's stride decreases, less and a smoother force throughout the stride is used.

In another exemplary embodiment, the raceway 60 has concentric grooves and another embodiment has textured ridges. While it is believed most beneficial to provide a smooth surface for animals and especially rodents having pads, some animals may well prefer a textured surface to run upon and the invention in accordance with this disclosure embraces such embodiments. The smooth surface is illustrated with respect to FIG. 3, while the concentric grooves embodiment is illustrated with respect to FIG. 7 and the textured surface is illustrated with respect to FIG. 8.

Another advantage of the device 50 in accordance with this invention is that even young rodents, such as chinchillas a week and half old may use the device 50 safely. In fact, prior art exercising devices, illustrated in FIGS. 1 and 2 are removed from the cages of such young rodents to prevent serious or even fatal injury. While such young rodents have larger feet than babies, they still have a serious risk of having their feet caught in the wire mesh of the prior art exercising devices. With the solid surface of the dish 52, the young rodent or similar animal can run safely.

While the foregoing describes several embodiments of a rodent and small animal exercise device in accordance with the present invention, it is to be understood that the above description is illustrative only and not limiting of the disclosed invention. It will be appreciated that it would be possible for one skilled in the art to modify a number of aspects of the small animal exercise device within the spirit and scope of the invention. Additionally, the dimensions set forth in the foregoing description are illustrative and may be modified within the spirit and scope of the invention. In particular, for example, the dimensions of the animal enclosure as well as the exercise device itself may be altered as needed to accommodate anticipated loads. Accordingly, the present invention is to be limited only by the claims as set forth below.

What is claimed is:

1. A small animal exercise device, comprising:
   a dish having a surface suitable for small animal exercise, the dish having an outer periphery and a raceway suitable for small animal exercise adjacent the outer periphery, the raceway suitable for small animal exercise and defining a solid surface;
   a stand for connection with the dish, the stand having a proximal and a distal end, the proximal end serving as a base and the distal end being suitable for connection with the dish, the base resting upon a horizontal surface and the dish being elevated above the surface; and
   a connecting assembly for rotatably connecting the dish to the stand, allowing the dish to rotate freely under small animal exercise, upon connection, the dish making an angle with the horizontal surface of approximately 30°, whereby, small animal exercise occurs on the solid surface of the raceway.

2. A small animal exercise device as set forth in claim 1, wherein the dish has an inner zone suitable for animal exercise defining a frusto-conical shape, the inner zone has an opening for accommodating the connecting assembly.

3. A small animal exercise device as set forth in claim 2, wherein the distal end of the stand defines a bearing shaft for rotatably connecting the dish to the stand, and the connecting assembly includes a bearing assembly connecting the dish and the distal end of the stand.

4. A small animal exercise device as set forth in claim 3, wherein the connecting assembly includes a center disk cover at least a substantial portion of the frusto-conical shape, the bearing assembly includes a bearing on either side the of the center disk for rotatably connecting the dish to the shaft.

5. A small animal exercise device as set forth in claim 4, wherein the center disk is fixedly attached to the dish and has a center opening aligned with the center opening of the dish, the dish being connected to the distal end of the shaft by inserting the dish from the distal end of the shaft and sliding it along toward the proximal end, the bearing assembly includes at least two bearings, the first bearing inserted along the shaft through the opening of the dish at the shaft proximal end and the second inserted along the shaft distal end through the center disk opening toward the first bearing.

6. A small animal exercise device as set forth in claim 5, wherein the shaft defines an angled bearing shaft, such that when the dish is connected to the shaft, the dish make a predetermined angle with the horizontal surface upon which the base rests.

7. A small animal exercise device as set forth in claim 5, wherein the connecting assembly includes a limiter member along the shaft for determining the relative position of the area of connection of the dish between the distal and proximal ends of the shaft.

8. A small animal exercise device as set forth in claim 7, wherein the limiter member fixes the dish between the distal and proximal ends of the shaft.

9. A small animal exercise device as set forth in claim 8, wherein the limiter member includes locking hardware for locking the limiter member to the shaft.

10. A small animal exercise device as set forth in claim 8, wherein connecting assembly includes a locking member for locking the dish in place along the bearing shaft.

11. A small animal exercise device as set forth in claim 1, wherein the dish is at least partially solid.

12. A small animal exercise device as set forth in claim 1, wherein the dish is substantially a solid surface.

13. A small animal exercise device as set forth in claim 1, wherein the raceway has a surface and the surface is smooth.

14. A small animal exercise device as set forth in claim 13, wherein the dish is shaped to form an angle of approximately 120°.

15. A small animal exercise device as set forth in claim 1, wherein the dish is shaped such that it forms an angular shape between 80° and 150°.

16. A small animal exercise device, comprising:
a parabolic shaped dish having a solid surface suitable for animal exercise, the dish having an outer periphery and a raceway suitable for animal exercise adjacent the outer periphery;
a stand operatively connected to the dish, the stand having a proximal and a distal end, the proximal end serving as a base and the distal end serving as a connection point with the dish, such that the dish rotates freely under small animal exercise; and
a connecting assembly operable to rotatably connect the dish to the stand, whereby small animal exercise occurs on the raceway.

17. A small animal exercise device as set forth in claim 16, wherein the base rests upon a horizontal surface and the dish is elevated above the surface to allow the dish to rotate freely under small animal exercise.

18. A small animal exercise device as set forth in claim 17, wherein the dish makes an angle with the horizontal surface of approximately 60°.

19. A small animal exercise device as set forth in claim 16, wherein the dish further includes an inner zone, and wherein the outer periphery and the inner zone define a shape having a curvature of between 100° and 140°.

* * * * *